(12) United States Patent
Martinez

(10) Patent No.: US 6,574,567 B2
(45) Date of Patent: Jun. 3, 2003

(54) WEIGHTED SLANT STACK FOR ATTENUATING SEISMIC NOISE

(75) Inventor: Ruben D. Martinez, Sugar Land, TX (US)

(73) Assignee: PGS Americas, Inc., Houston, TX (US)

( * ) Notice: Subject to any disclaimer, the term of this patent is extended or adjusted under 35 U.S.C. 154(b) by 49 days.

(21) Appl. No.: 09/767,650

(22) Filed: Jan. 23, 2001

(65) Prior Publication Data

US 2002/0138202 A1 Sep. 26, 2002

(51) Int. Cl.$^7$ .................................................. G01V 1/28
(52) U.S. Cl. .......................................................... 702/17
(58) Field of Search ........................ 702/17, 14; 367/46, 367/45, 43, 73

(56) References Cited

U.S. PATENT DOCUMENTS

| | | |
|---|---|---|
| 3,398,396 A | 8/1968 | Embree |
| 5,138,583 A | 8/1992 | Wason et al. |
| 5,235,556 A | 8/1993 | Monk et al. |
| 5,596,547 A | 1/1997 | Bancroft et al. |
| 5,970,023 A | 10/1999 | Chambers et al. |

OTHER PUBLICATIONS

Monk, D., Cowan, P., and Crook, H., An approach to optimum slant stack; its application as a seismic noise attenuator, First Break vol. 11, No. 12, Dec. 1993.

Russell, B. and Hampson, D., Noise elimination and the Radon transform, Part 2, Geophysics: The Leading Edge of Exploration, Nov. 1990, p. 31–37.

Russell, B. and Hampson, D., Noise elimination and the Radon transform, Part 1, Geophysics: The Leading Edge of Exploration, Oct. 1990, p. 18–23.

*Primary Examiner*—Donald E. McElheny, Jr.
(74) *Attorney, Agent, or Firm*—E. Eugene Thigpen

(57) ABSTRACT

A method and apparatus are disclosed for attenuating noise in seismic data including a plurality of input traces. The method includes transforming the seismic data from the space-time domain into the slant-stack domain. Seismic data having a preselected characteristic is excluded when the transforming into the slant-stack domain. The transformed data is inverse transformed from the slant-stack domain into the time space domain. The method and apparatus may include anti-alias filtering the seismic traces. The method and apparatus may include p-anti-alias filtering seismic traces.

41 Claims, 7 Drawing Sheets

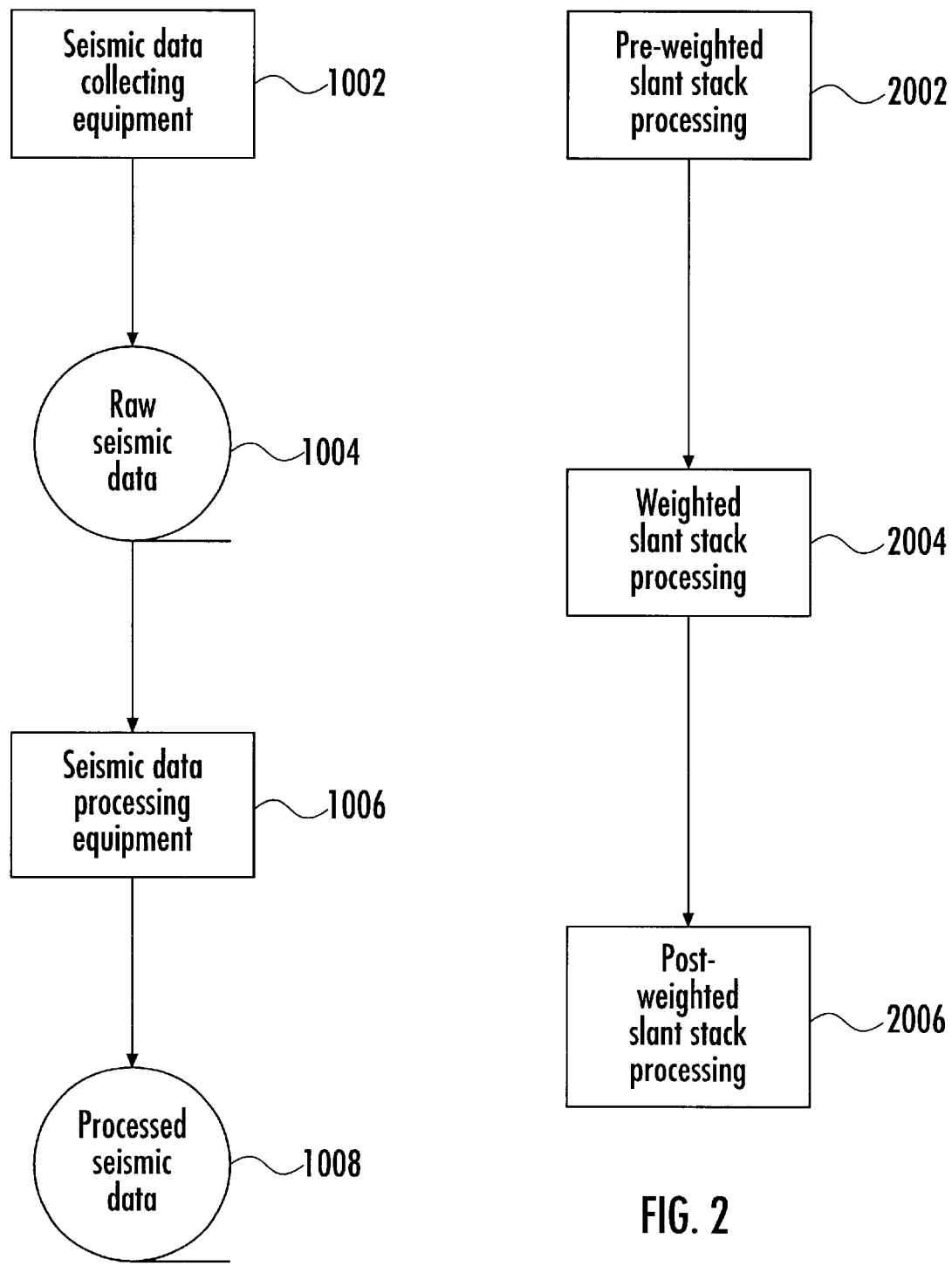

$$p_N = \frac{\sqrt{\dfrac{1}{\Delta x^2} + \dfrac{1}{\Delta y^2}}}{2 \cdot f_{Nyquist}}$$

$$f_{alias} = \frac{\sqrt{\dfrac{1}{\Delta x^2} + \dfrac{1}{\Delta y^2}}}{2 \cdot \sqrt{p_x^2 + p_y^2}}$$

$$FIL(\omega) = \frac{TAR(\omega) \cdot IN^*(\omega)}{IN(\omega) \cdot IN^*(\omega) + 1.0E - 0.5}$$

WEIGHTED SLANT STACK FOR ATTENUATING SEISMIC NOISE

FIELD OF THE INVENTION

The invention relates to the field of attenuating noise in signals. More particularly, the invention relates to attenuating incoherent, impulsive and coherent noise in seismic data. Even more particularly, the invention relates to using a weighted slant stack to attenuate incoherent, impulsive and coherent noise in seismic data.

BACKGROUND OF THE INVENTION

Geophysicists collect seismic data and analyze it to determine the characteristics of underground and undersea formations. Such information is useful in the search for hydrocarbons and other minerals.

In its raw, unprocessed form, seismic data consists of a large number, typically millions, of "traces." Each trace is a recording of a signal which represents the seismic energy emitted by a seismic transmitter, reflected off underground formations and received by a receiver. The seismic energy may be transmitted by an underground or undersea explosion or the action of a vibrator truck or through some other means of imparting energy into the earth. The seismic data typically includes signals gathered from receivers arrayed in two dimensions over a geographical region to be analyzed. Typically, a number of traces is gathered from each receiver, with the location of the source of the seismic energy being varied from one trace to the next.

In many cases, analysis of the seismic data is complicated by unwanted noise recorded in the traces along with the signal. The noise may include incoherent noise, impulsive noise or coherent noise or all of those together. Incoherent noise is random noise such that the incoherent noise from two or more traces tends to have a low level of correlation. Impulsive noise tends to appear in the form of spikes or abnormally large amplitudes in isolated portions of a seismic trace or in a whole trace in a number of traces of the seismic data set. Coherent noise tends to correlate among traces and, in many cases, can be grouped early in the processing of the seismic data into sets having identifiable "time dips."

Incoherent noise is traditionally attenuated by "stacking" or adding a group of traces together. Since incoherent noise is random, it tends to be eliminated by the stacking process. More effective elimination of incoherent noise is accomplished by a technique called f-x-y prediction error filtering (fxy PEF). This technique predicts the signal in the x-y space at each temporal frequency f, thereby reducing the incoherent noise, which is not predictable.

Impulsive noise is usually attenuated using statistical techniques in running windows in which abnormally large amplitudes are edited based on certain types of average measurement. Other techniques use adaptive filtering or neural networks. These algorithms are based on prior training on data containing a typical signal and typical noise. Once the algorithm understands what the signal is and what the noise is, the algorithm is applied to a data set.

Existing techniques for attenuating coherent noise include transforming the traces from the space-time domain into a transform domain, such as the f-k or Radon or slant-stack domain, in which the signal is separated from the noise. The noise is muted in the transform domain and the signal is transformed back into the space-time domain for further processing. Since the noise was muted in the transform domain, it is attenuated in the space-time domain. For example, coherent noise having a particular time dip may be separated from the signal in transforming a trace into the Radon or slant-stack transform domain where it can be muted.

Other existing technologies include combining the diversity stack technique with the slant stack technique. In this technique, incoherent noise is attenuated by a variation on the diversity stack technique and coherent noise is attenuated by transforming the traces to the Radon or slant-stack domain, muting the traces associated with the coherent noise, and transforming the traces back into the space-time domain. The impulsive noise is also attenuated by the diversity technique by suppressing abnormally large amplitudes present in the amplitude array to be stacked.

SUMMARY OF THE INVENTION

In general, in one aspect, the invention features a method of attenuating noise in seismic data including a plurality of input traces. The method includes transforming the seismic data from the space-time domain into the slant-stack domain. Seismic data having a preselected characteristic is excluded when the transforming into the slant-stack domain. The transformed data is inverse transformed from the slant-stack domain into the time space domain.

Implementations of the invention may include one or more of the following. Transforming may include transforming the seismic data from the space-time domain into the $\tau$–p domain. Excluding may include excluding data corresponding to the coordinates: $t=\tau+px$, where $t$ is time, $\tau$ is a t-axis intercept, $x$ is a signed distance from an origin and $p$ is a slope. Transforming may include transforming the seismic data from the space-time domain into the $\tau$–$p_x$–$p_y$ domain. Excluding may include excluding data corresponding to the coordinates: $t=\tau+p_x x+p_y y$, where $t$ is time, $\tau$ is a t-axis intercept, $x$ is a signed distance from an origin in a first direction, $y$ is a signed distance from an origin in a second direction, $p_x$ is slope in the first direction, and $p_y$ is slope in the second direction.

In general, in another aspect, the invention features a method of attenuating noise in seismic data. The method includes accepting seismic data comprising a plurality of traces arrayed in two physical dimensions and a time dimension. The method further includes transforming the seismic data into the slant stack domain using a Radon transform.

Implementations of the invention may include one or more of the following. The Radon transform may include a three-dimensional transform using the following equation:

$$T(\tau, p_x, p_y) = \frac{N \cdot \sum_{x=a}^{b}\sum_{y=c}^{d} S_{x,y}(\tau + p_x x + p_y y, x, y) \cdot F_{x,y}(\tau + p_x x + p_y y, x, y)}{\sum_{x=a}^{b}\sum_{y=c}^{d} F_{x,y}(\tau + p_x x + p_y y, x, y)}$$

where:

N is the number of traces in the plurality of traces;

$S_{x,y}(t)$ is a subset of the plurality of traces;

$F_{x,y}(t)$ is a scaling function;

x is a distance in a first direction;

$p_x$ is a slope in the first direction;

y is a distance in a second direction;

$p_y$ is a slope in the second direction;

a and b for the first direction and c and d for the second direction define a volume to be transformed;

t is time in the space-time domain;

$\tau$ is intercept time in the $\tau$–p domain; and $T(\tau, p_x, p_y)$ is the output data.

The following equation may apply:

$$F_{x,y}(t) = \frac{1}{\overline{S}_{x,y}(t)}$$

where $\overline{S}_{x,y}(t)$ is an average of $S_{x,y}(t)$ over predetermined ranges of x, y and t for each x, y and t.

The following equation may apply:

$$F_{x,y}(t) = \frac{1}{\overline{S}^2_{x,y}(t)}$$

where $\overline{S}^2_{x,y}(t)$ is an average of $S^2_{x,y}(t)$ over predetermined ranges of x, y and t for each x, y and a, b, c and d may be such that x and y span $S_{x,y}(t)$, a, b, c and d may be such that x and y define a subset of $S_{x,y}(t)$. The subset defining $S_{x,y}(t)$ may be the full set.

The method may include Fourier transforming $T(\tau,p_x, p_y)$, multiplying the Fourier-transformed data by $\omega^2$; and inverse-Fourier transforming the Fourier-transformed data.

The Radon transform may include a two-dimensional transform using the following equation:

$$T(\tau, p) = \frac{N \cdot \sum_{x=a}^{b} S_{x,y}(\tau + px, x) \cdot F_{x,y}(\tau + px, x)}{\sum_{x=a}^{b} F_{x,y}(\tau + px, x)}$$

where:

N is the number of traces in the plurality of traces;

$S_{x,y}(t)$ is a subset of the plurality of traces;

$F_{x,y}(t)$ is a scaling function;

x is a distance from the origin;

p is a slope;

a and b define a slice of data to be transformed;

t is time in the space-time domain;

$\tau$ is intercept time in the $\tau$–p domain; and $T(\tau,p)$ is the output data.

The method may include Fourier transforming $T(\tau,p)$, multiplying the Fourier-transformed data by $\omega$, and inverse-Fourier transforming the Fourier-transformed data.

The method may include applying an anti-aliasing filter. Applying may be performed in the slant stack domain.

The method may include applying a matched filter to compensate for limited spatial aperture.

The method may include inverse Radon transforming the transformed data.

In general, in another aspect, the invention features a method of attenuating noise in seismic data. The seismic data includes a plurality of traces arrayed in two physical dimensions and the time dimension. The method includes:

(a) selecting a volume, the volume comprising a subset of the plurality of traces;

(b) transforming the volume into the slant stack domain using a Radon transform;

(c) inverse transforming the transformed volume into the time domain using a inverse Radon transform; and (d) repeating elements (b) and (c) with a new volume.

Implementations of the invention may include one or more of the following. The new volume may overlap the volume.

The method may include iteratively repeating elements (b) and (c) with new volumes for each iteration, each successive new volume overlapping the preceding new volume.

The plurality of traces may be arrayed in rows and the overlap between each successive new volume and the preceding new volume may be one row.

In general, in another aspect, the invention features a method of attenuating noise in zero offset and/or common offset seismic data. The seismic data includes a plurality of input traces. The method includes:

(a) computing scaling traces from the input traces;

(b) modifying the input traces using the scaling traces;

(c) slant-stack transforming the modified input traces, excluding slopes corresponding to coherent noise from the slant-stack transform, to produce slant-stack-domain signal traces;

(d) slant-stack transforming the scaling traces to produce slant-stack-domain scaling traces;

(e) modifying the slant-stack-domain signal traces using the slant-stack-domain scaling traces;

(f) scaling and filtering the modified slant-stack-domain signal traces to produce weighted slant stacked traces;

(g) inverse slant-stack transforming the weighted slant stacked traces; and (h) scaling the inverse-slant-stack-transformed weighted slant stacked traces.

In general, in another aspect, the invention features a computer program for attenuating noise in seismic data. The computer program executes on a computer processor. The computer program resides on computer readable media. The computer program includes computer code for causing the computer processor to transform the seismic data from the time-space domain into the slant-stack domain. The computer code for causing the computer processor to transform the seismic data includes computer code for excluding seismic data having a preselected characteristic and transforming the transformed data from the slant-stack domain into the time-space domain.

In general, in another aspect, the invention features an apparatus for attenuating noise in seismic data. The seismic data includes a plurality of input traces. The apparatus includes a means for transforming the seismic data from the time-space domain into the slant-stack domain. The transforming means includes means for excluding, during said transforming into the slant-stack domain, seismic data having a preselected characteristic. The apparatus further includes means for transforming the transformed data from the slant-stack domain into the time-space domain.

In general, in another aspect, the invention features an apparatus for anti-alias filtering seismic traces including a means for calculating a Nyquist dip $p_N$. The apparatus further includes a means for selecting one or more dip traces having magnitudes greater than the Nyquist dip. The apparatus further includes a means for calculating an alias frequency $f_{alias}$. The apparatus further includes a means for applying an FFT to the selected dip traces to produce transformed selected dip traces including samples. The apparatus further includes a means for zeroing all samples in each of the transformed selected dip traces with frequencies greater than $f_{alias}$.

Implementations of the invention may include one or more of the following. The apparatus may include means for cosine tapering the zeroed transformed selected dip traces. The apparatus may include a three-dimensional anti-aliasing filter and the means for calculating a Nyquist dip $p_N$ may include applying the following equation:

$$p_N = \frac{\sqrt{\frac{1}{\Delta x^2} + \frac{1}{\Delta y^2}}}{2 \cdot f_{Nyquist}};$$

where $\Delta x$ and $\Delta y$ are sampling intervals in the x and y directions, respectively; and $f_{Nyquist}$ is the Nyquist frequency.

The apparatus may include a two-dimensional anti-aliasing filter and the means for calculating a Nyquist dip $p_N$ may include applying the following equation:

$$p_N = \frac{1}{2 \cdot \Delta x \cdot f_{Nyquist}};$$

where $\Delta x$ is the sampling interval in the x direction; and $f_{Nyquist}$ is the Nyquist frequency.

The apparatus may include a three-dimensional anti-aliasing filter and the means for calculating an alias frequency $f_{alias}$ may include applying the following equation:

$$f_{alias} = \frac{\sqrt{\frac{1}{\Delta x^2} + \frac{1}{\Delta y^2}}}{2 \cdot \sqrt{p_x^2 + p_y^2}};$$

where $\Delta x$ and $\Delta y$ are the sampling intervals in the x and y directions, respectively;

$p_x$ is the current dip in the x-direction;

$p_y$ is the current dip in the y-direction; and $f_{alias}$ is the Nyquist dip.

The apparatus may include a two-dimensional anti-aliasing filter and the means for calculating an alias frequency $f_{alias}$ may include applying the following equation:

$$f_{alias} = \frac{1}{2 \cdot \Delta x \cdot p};$$

where $\Delta x$ is the sampling interval in the x direction; and p is the current dip.

In general, in another aspect, the invention features a method for p-anti-alias filtering seismic traces. The method includes applying a weighted slant stack algorithm to the seismic data for a flat dip range to produce a first result. The method further includes subtracting the first result from the seismic data to produce a second result. The method further includes applying the weighted slant stack algorithm to the second result to produce a third result. The method further includes adding the third result to the first result.

Implementations of the invention may include one or more of the following. The flat dip range may be centered around zero dip.

BRIEF DESCRIPTION OF THE DRAWING

FIG. 1 is a block diagram of a seismic data processing system.

FIGS. 2, 3 and 4 are flow charts of seismic data processing according to the present invention.

DESCRIPTION OF EXAMPLE EMBODIMENTS OF THE INVENTION

Geophysicists and other scientists and engineers use seismic data collecting equipment 1002 to collect raw seismic data which is stored on a memory device 1004 which, according to one example embodiment, comprises a magnetic or optical disk drive, a tape drive, or other memory devices that would occur to those of skill in the art, as shown in FIG. 1. Seismic data processing equipment 1006 is used to process the seismic data. The seismic data processing equipment 1006 includes, in an example embodiment, a computer, a signal processor, or other signal analysis and processing equipment. In some embodiments, the seismic data processing equipment includes equipment useful in formatting and displaying seismic data on a display screen or on a paper printout. Further, the seismic data processing equipment stores the processed seismic data on a memory device 1008. In some embodiments, memory device 1008 comprises the same memory device where the raw seismic data is stored. In other embodiments, it comprises another memory device.

According to one non-limiting example embodiment of the invention, the processing performed by the seismic data processing equipment 1006 begins with pre-weighted slant stack processing 2002, as shown in FIG. 2. In various embodiments, this includes such conventional processing as statics, spherical divergence corrections, deconvolution, amplitude recovery and stack for the poststack application of the weighted slant stack technique. For the prestack application, only statics and spherical divergence correction are required. Any combination of the foregoing, or even additional processes known to those of skill in the art, are performed according to a variety of embodiments of the invention.

Figure 3:
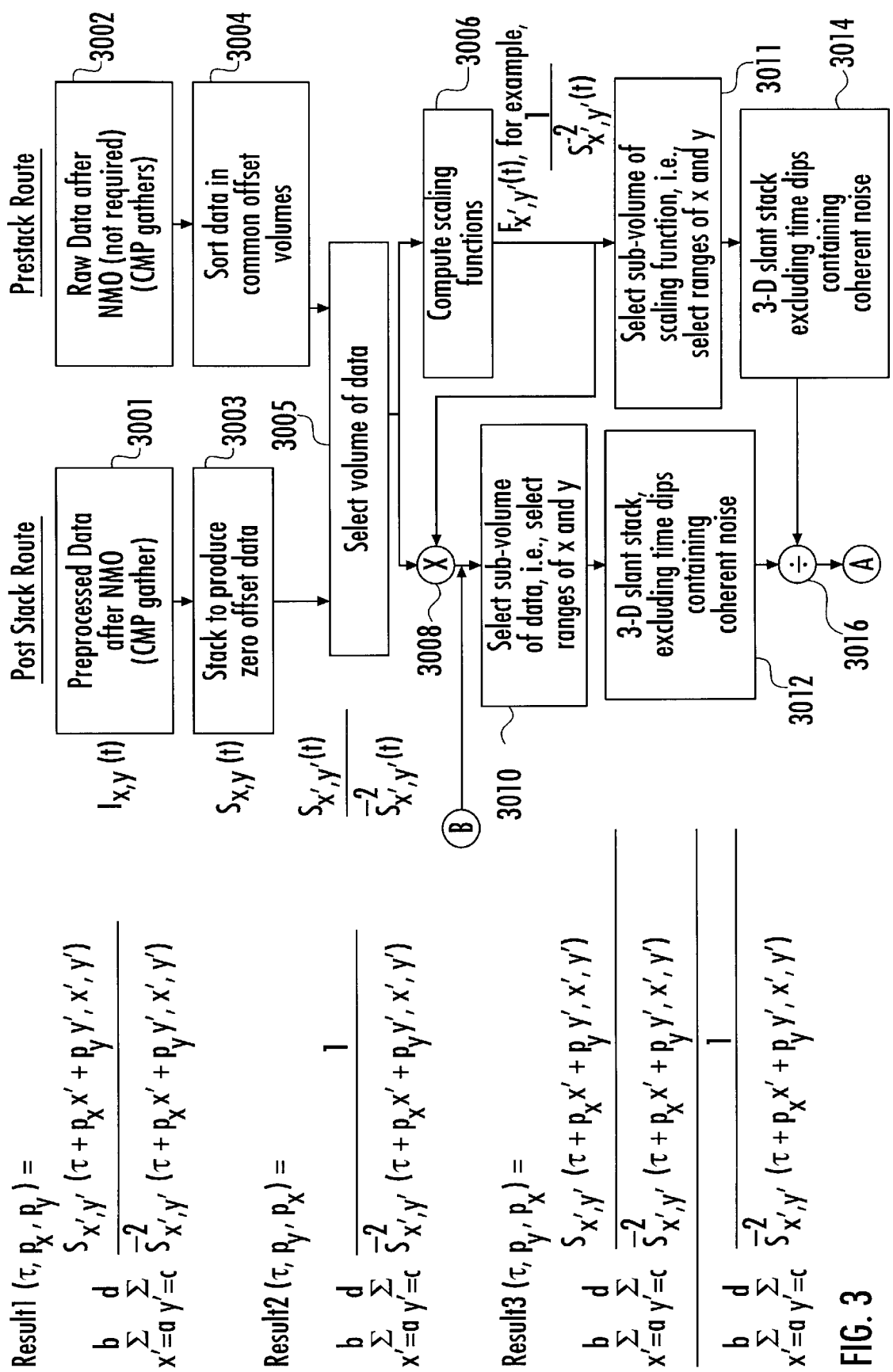
Figure 4:
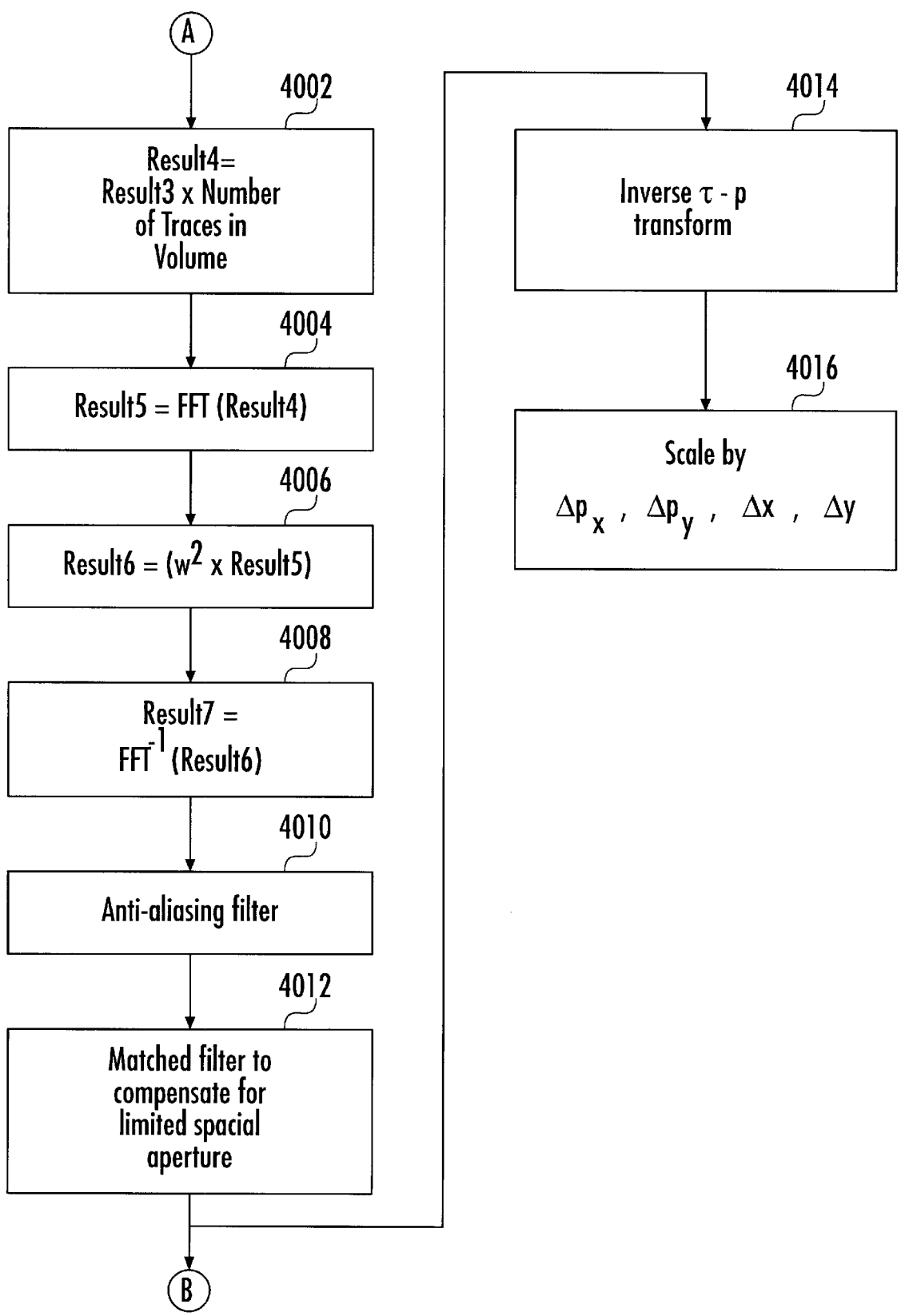

The next procedure is to perform the weighted slant stack processing 2004, which is discussed in more detail in the description of FIGS. 3 and 4. Finally, the seismic data processing equipment 1006 performs post-weighted slant stack processing 2006. In various embodiments, such processing includes conventional processing, such as dip move out, stack migration, filtering the resulting data, and displaying the data on a computer display. Again, any combination of the foregoing or further processing is performed according to alternative embodiments of the invention.

The weighted slant stack processing 2004 can be performed on pre-stack data or post-stack data, as illustrated in FIG. 3. If the post-stack route is followed, a normal moveout (NMO) is applied to the preprocessed data (block 3001) to produce:

$$I_{x,y}(t) \quad (1)$$

which indicates that the data is distributed in two dimensions in space (x and y) and in time. The result is stacked to produce zero offset data (block 3003):

$$S_{x,y}(t) \quad (2)$$

If the pre-stack route is followed, $I_{x,y}(t)$ is formed from raw data (block 3002). NMO processing may be applied, but it is not necessary to do so. The weighted slant stack processing 2004 sorts the raw data into common offset volumes (block 3004) to produce $S_{x,y}(t)$. In either case, the weighted slant stack processing 2004 selects a volume of data to be processed (block 3005). The selected volume is denoted $S_{x',y'}(t)$ with the subscripts being primed. If the post-stack route is followed the volume will contain zero offset data. If the pre-stack route is chosen, the volume will be one of the common offset volumes formed in the preceding step. Both routes invoke the concept of local slant stacks.

The weighted slant stack processing 2004 then computes scaling functions (block 3006):

$$F_{x',y'}(t) \quad (3)$$

In various embodiments, the scaling function takes a variety of forms, depending on whether it is desired to normalize the amplitude, or the power, or some other feature of the zero-offset or common offset data. In one example embodiment in which the amplitude of the zero-offset or common offset data is normalized, the following function, or some variant, is used:

$$F_{x',y'}(t) = \frac{1}{\overline{S}_{x',y'}(t)} \quad (4)$$

where $\overline{S}_{x',y'}(t)$ consists essentially of the average amplitude over a portion of the trace at location (x',y'). In two alternative examples, $\overline{S}_{x',y'}(t)$ consists essentially of the windowed average over a segment of that trace. The scalers are computed in moving windows in all traces of the subvolume of data. In an alternative embodiment, when the power of the zero-offset or common offset data is normalized, the following function, or some variant, is used:

$$F_{x',y'}(t) = \frac{1}{\overline{S}^2_{x',y'}(t)} \quad (5)$$

where $\overline{S}^2_{x',y'}(t)$ is the square of $\overline{S}_{x',y'}(t)$.

For the rest of the discussion, the scaling function will be defined as the function shown in equation (5). It will be understood, however, that the invention is not limited to the scaling functions shown in equations (4) or (5). It comprises any function that accomplishes the purpose required of the scaling function.

Referring again to the non-limiting example embodiment of FIG. 3, the weighted slant stack processing 2004 then multiplies (block 3008) the zero-offset or common offset data, on a point-by-point basis, by the scaling function (meaning that the zero-offset or common offset data at location (x',y') and at depth t, is multiplied by the scaling function at location (x',y') and at depth $t_1$) to produce the following result (block 3008):

$$\frac{S_{x',y'}(t)}{\overline{S}^2_{x',y'}(t)} \quad (6)$$

Figure 5:
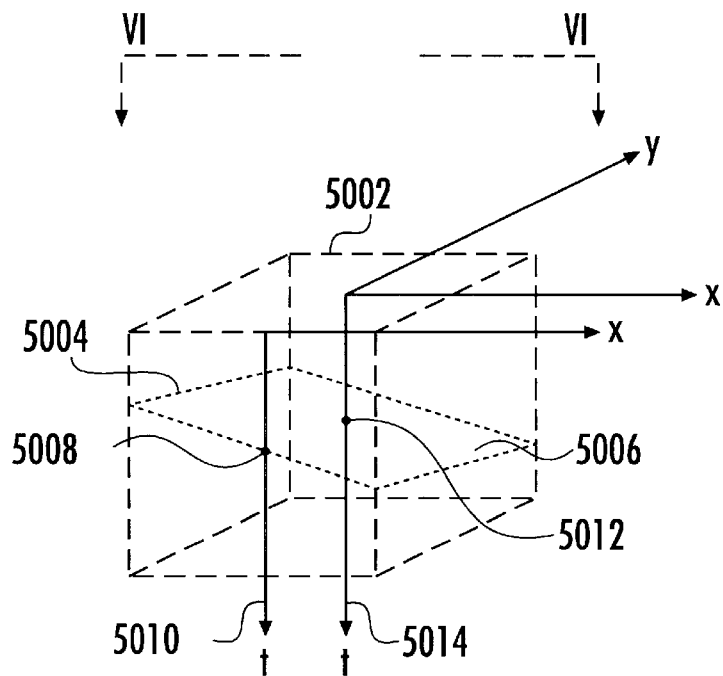
FIG. 5 is a perspective view of a volume of seismic traces.
Figure 6:
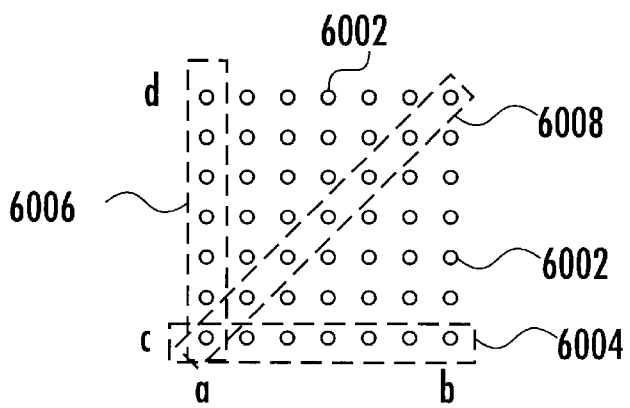
FIG. 6 is a view of the volume of seismic traces shown in FIG. 5 along lines VI.

The weighted slant stack processing 2004 then enters a loop in which the first process is to select a subvolume of data to transform (block 3010). The volume consists essentially of, in one embodiment, a rectangular volume in the spatial dimensions. In another embodiment, the volume 5002 consists essentially of a square volume, as shown in FIG. 5. For simplicity, the traces within volume 5002 are not shown in FIG. 5. They are illustrated end-on in FIG. 6. Whatever the shape, the volume 5002 encompasses a set of traces 6002 arrayed within the boundaries of the volume, as shown in FIG. 6. Similarly, the weighted slant stack processing 2004 selects a corresponding subvolume of scaling functions (block 3011).

In example embodiments in which the weighted slant stack processing 2004 is to perform a two-dimensional slant stack, as discussed below, the volume is along one of the x or y axes (for example, volume 6004 or volume 6006, respectively). In another example, it is along an angle to the two axes (for example, volume 6008), and includes a line of, preferably, seven traces. Other examples will occur to those of skill in the art. In an example embodiment in which the weighted slant stack processing 2004 is to perform a three-dimensional slant stack, as discussed below, the volume is, in one sub-example, a seven-by-seven, two-dimensional volume of traces which includes all of the traces shown in FIG. 6. Other three-dimensional parameters are useful in other embodiments and will occur to those of ordinary skill without further elaboration.

In the next process, the weighted slant stack processing 2004 transforms the selected subvolume into the slant-stack domain (block 3012). The slant-stack domain may be referred to as the $\tau$–p domain in two dimensions and as the $\tau$–$p_x$–$p_y$ domain in three dimensions. Note that for simplicity FIGS. 3 and 4 show only the equations for the three-dimensional case. The equations for the two-dimensional case are shown below.

In a two-dimensional weighted slant stack using, for example, volume 6004, the following computation is performed:

$$\text{Result1}(\tau, p) = \sum_{x'=a}^{b} \frac{S_{x',y'}(\tau + px', x')}{\overline{S}^2_{x',y'}(\tau + px', x')} \quad (7)$$

Result1($\tau$,p) for a particular ($\tau$,p) pair is the sum of the result of equation (6) along line 5004 (FIG. 5), where $\tau$ is the intercept time 5008 of line 5004, and p is the slope of line 5004. In the two dimensional case the t axis 5010 bisects the two dimensional volume. The weighted slant stack processing 2004 does not evaluate Result1($\tau$,$p_n$) where each $p_n$ corresponds to a slope containing coherent noise. Thus, coherent noise is not transformed by equation (7). The processing for volume 6006 or 6008 would be similar.

In a three-dimensional slant stack using volume 5002, the following computation is performed:

$$\text{Result1}(\tau, p_x, p_y) = \sum_{x'=a}^{b} \sum_{y'=c}^{d} \frac{S_{x',y'}(\tau + p_x x' + p_y y, x', y')}{\bar{S}_{x',y'}^{-2}(\tau + p_x x' + p_y y, x', y')} \quad (8)$$

Result1($\tau,p_x,p_y$) for a particular ($\tau,p_x,p_y$) triplet is the double sum of the result of equation (6) along plane 5006 (FIG. 5), where $\tau$ is the intercept time 5012 of plane 5006, $p_x$ is the slope of the plane 5006 in the x direction and $p_y$ is the slope of the plane 5006 in the y direction. In the three dimensional case, the t axis 5014 is through the center of volume 5002. The weighted slant stack processing 2004 does not evaluate Result1($\tau,p_n,p_m$) where each ($p_n,p_m$) corresponds to a slope containing coherent noise. Thus, coherent noise is not transformed by equation (8).

In the next process, the weighted slant stack processing 2004 performs a similar function on the scaling functions (block 3014) to produce the following result for two-dimensional slant stacks:

$$\text{Result2}(\tau, p) = \sum_{x'=a}^{b} \frac{1}{\bar{S}_{x',y'}^{-2}(\tau + px', x')} \quad (9)$$

and the following result for three-dimensional slant stacks:

$$\text{Result2}(\tau, p_x, p_y) = \sum_{x'=a}^{b} \sum_{y'=c}^{d} \frac{1}{\bar{S}_{x',y'}^{-2}(\tau + p_x x' + p_y y, x', y')} \quad (10)$$

In the next process, the weighted slant stack processing 2004 divides (block 3016) Result1 by Result2:

$$\text{Result3}(\tau, p) = \frac{\text{Result1}(\tau, p)}{\text{Result2}(\tau, p)} \quad (11)$$

for two-dimensional slant stacks and $$\text{Result3}(\tau, p_x, p_y) = \frac{\text{Result1}(\tau, p_x, p_y)}{\text{Result2}(\tau, p_x, p_y)} \quad (12)$$

for three-dimensional slant stacks.

In the next process, the weighted slant stack processing 2004 multiplies Result3 by the number of traces N in the subvolume (block 4002 in FIG. 4).

$$\text{Result4}=N \cdot \text{Result3} \quad (13)$$

For example, for the two-dimensional subvolume 6004 N is 7 and for the three-dimensional volume 5002 N is 49. Multiplication by N recovers a portion of the amplitude of the seismic data that was lost in performing process 3016.

The weighted slant stack processing 2004 further recovers the amplitude of the seismic data by taking the Fourier transform of Result4 (block 4004):

$$\text{Result5}=FFT(\text{Result4}) \quad (14)$$

For 2D weighted slant stacks, the data is then multiplied by the angular frequency $\omega$ in the frequency domain (block 4006):

$$\text{Result6}=\omega \text{Result5} \quad (15)$$

and for 3D weighted slant stacks, the data is then multiplied by the square of the angular frequency in the frequency domain (block 4006):

$$\text{Result6}=\omega^2 \cdot \text{Result5}$$

and an inverse Fourier transform is applied (block 4008):

$$\text{Result7}=FFT^{-1}(\text{Result6}) \quad (16)$$

The weighted slant stack processing 2004 filters Result7 to remove aliased data (block 4010) and applies a matched filter to compensate for the limited spatial aperture of the data (block 4012).

The weighted slant stack processing 2004 next inverse transforms the data from the slant-stack domain to the time-space domain (block 4014), using the following equation in the two-dimensional case:

$$d(t, x) = \sum_{p} R(t - px, p) \quad (17)$$

and using the following equation in the three-dimensional case:

$$d(t, x, y) = \sum_{p_x} \sum_{p_y} R(t - xp_x - yp_y, p_x, p_y) \quad (18)$$

Finally, the weighted slant stack processing 2004 scales the result by $\Delta x$ (the trace interval in x), $\Delta y$ (the trace interval in y), $\Delta p_x$ (the dip increment in x), and $\Delta p_y$ (the dip increment in y) (block 4016) in the three dimensional case and $\Delta p$ (the dip increment) and $\Delta x$ (the trace interval in x) in the two dimensional case.

At this point, the weighted slant stack processing 2004 has reached the end of the loop and returns to step 3010, where it selects a new subvolume. In the two-dimensional case, the new volume may be volume 6004 shifted one trace in the x direction, or an entire row in the y direction. In the three-dimensional case, the new volume may be volume 5002 shifted a row in the x direction or y direction or any other shift that accomplishes the purpose. The weighted slant stack processing 2004 continues to run in this loop until all of the desired data has been processed. For convenience, the result in the two-dimensional case will be referred to as R($\tau$,p) and the result in the three-dimensional case will be referred to as R($\tau,p_x,p_y$).

Figure 7:
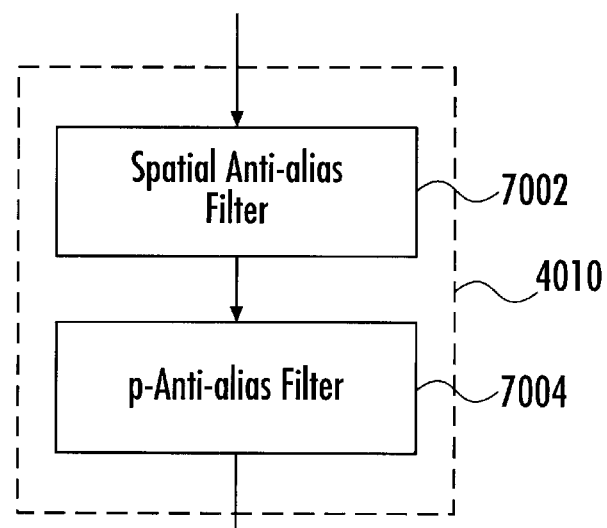
FIG. 7 is a flow chart of an anti-alias filter according to the present invention.

In one example embodiment, the anti-aliasing filter 4010 includes two components, as shown in FIG. 7. A spatial anti-aliasing filter 7002 addresses aliasing distortions caused by sampling in the spatial domain. A p-anti-aliasing filter 7004 addresses aliasing distortions caused by the transform in the p domain.

Figure 8:
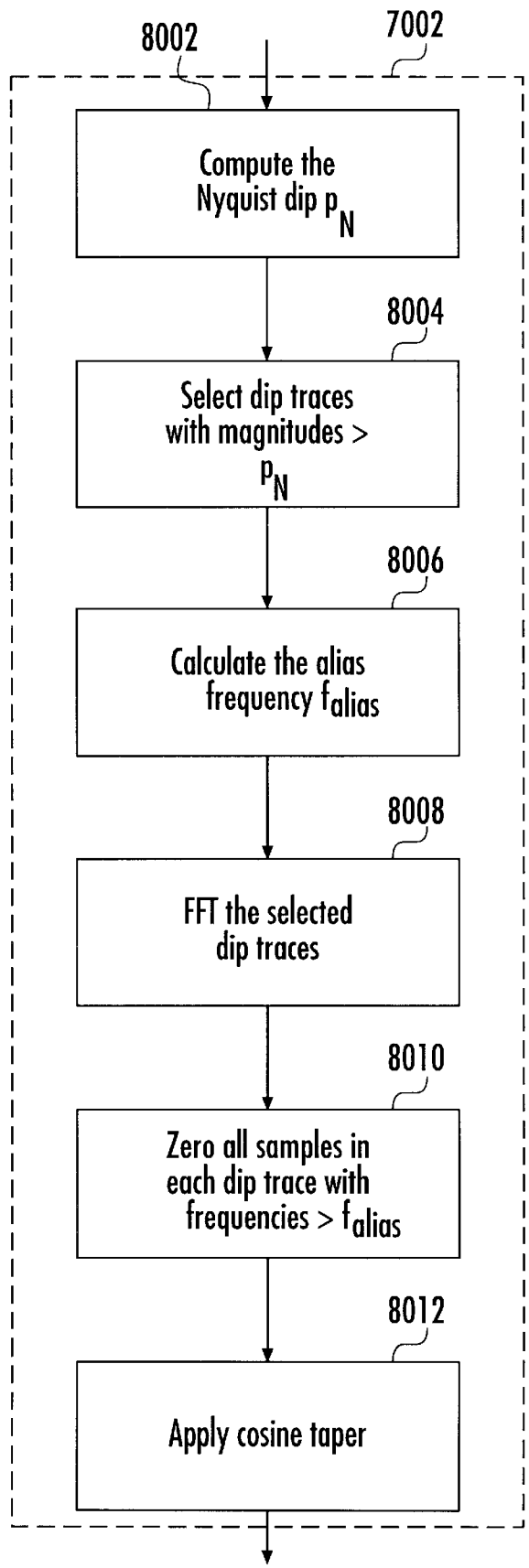
FIG. 8 is a flow chart of a spatial anti-alias filter according to the present invention.

With regard to the spatial anti-aliasing filter 7002, traces with dips whose magnitudes are less than or equal to a Nyquist dip do not need anti-aliasing filtering, while traces with dips whose magnitudes are greater than the Nyquist dip need such filtering. The spatial anti-aliasing filter 7002 may be implemented in two-dimensions, by computing the Nyquist dip (block 8002), as shown in FIG. 8, using equation (19):

$$p_N = \frac{1}{2 \cdot \Delta x \cdot f_{Nyquist}} \quad (19)$$

where $p_N$ is the Nyquist dip;

$\Delta x$ is the spatial sampling interval; and $f_{Nyquist}$ is the Nyquist frequency.

in three-dimensions, the Nyquist dip would be computed using equation (20):

$$p_N = \frac{\sqrt{\frac{1}{\Delta x^2} + \frac{1}{\Delta y^2}}}{2 \cdot f_{Nyquist}} \qquad (20)$$

where $\Delta x$ and $\Delta y$ are the sampling intervals in the x and y directions, respectively.

The spatial anti-aliasing filter 7002 next selects those dip traces whose magnitude exceed $p_N$ (block 8004). In two dimensions, the current dip p is compared to $p_N$. In three dimensions, the current dip defined by equation (21) is compared to $p_N$:

$$p = \sqrt{p_x^2 + p_y^2} \qquad (21)$$

For each dip trace in which the dip exceeds $p_N$, the spatial anti-aliasing filter calculates the aliasing frequency $f_{alias}$ (block 8006). In two dimensions, $f_{alias}$ is calculated using equation (22):

$$f_{alias} = \frac{1}{2 \cdot \Delta x \cdot p} \qquad (22)$$

where $f_{alias}$ is the Nyquist frequency.

In three dimensions, $f_{alias}$ is calculated using equation (23):

$$f_{alias} = \frac{\sqrt{\frac{1}{\Delta x^2} + \frac{1}{\Delta y^2}}}{2 \cdot \sqrt{p_x^2 + p_y^2}} \qquad (23)$$

This step need only be performed once and $f_{alias}$ values are stored for multiple uses. The spatial anti-aliasing filter 7002 next performs a Fast Fourier Transform (FFT) on each dip trace whose dip exceeds $p_N$ (block 8008). The spatial anti-aliasing filter 7002 retains all complex samples whose frequency is less than or equal to $f_{alias}$ and zeroes out all other complex samples (block 8010). Finally, the anti-aliasing filter applies a cosine taper to reduce oscillations due to truncation (block 8012), calculated as shown below:

SIZE=$NF-L2-1$ for i=L2 to NF:

$$ftaper(i) = 0.5 \cdot \left(1 - \cos\left(\pi \cdot \frac{NF - i}{SIZE}\right)\right) \qquad (24)$$

next i where ftaper(i) is the cosine taper function;

L2 is the sample corresponding to some percent (usually 10 percent) of $f_{alias}$;

NF is the sample corresponding to $f_{alias}$; and

SIZE is the length of the taper in samples.

For example, if the total recorded time is 5 seconds at 4 msecs, df=0.2 Hz, where df is the sampling interval in frequency (i.e., 1/(total recorded time)) and $f_{alias}$=80 Hz. Ten percent of $f_{alias}$ is 8 Hz and L2=0.1. $f_{alias}$/df+1=41 samples.

Figure 9:
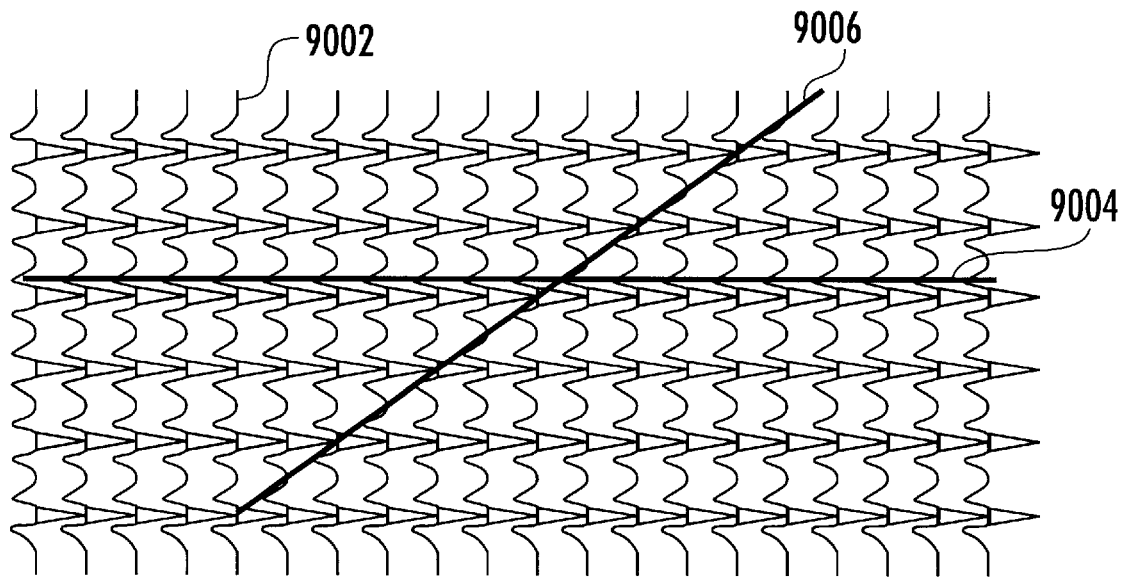
FIG. 9 is a representation of seismic data, a flat dip line and a steep dip line.

The p-anti-aliasing filter 7004 compensates for a form of aliasing, known as "p-aliasing," which can occur even when the seismic data is not spatially aliased, as illustrated in FIG. 9. A set of synthetic traces 9002 show several parallel, horizontal events with dip equal to zero. As can be seen, there is no spatial aliasing in the data.

p-aliasing becomes apparent when the weighted slant stack algorithm described above is applied once with a flat dip 9004 and a second time with a steep dip 9006, which intersects a series of peaks from the respective traces. When the algorithm is applied with the flat dip 9004, stacking the data will produce the proper events. When the algorithm is applied with the steep dip 9006, however, stacking the data will produce another set of events, which are anomalies of the processing and add noise to the result. Thus, for the set of flat events illustrated in FIG. 9, there is an ambiguity. The true dip is zero but there is a contribution from a steep dip 9006. If the processing is searching for a steep dip it will find an illegitimate stack contribution for steep dip 9006.

Figure 10:
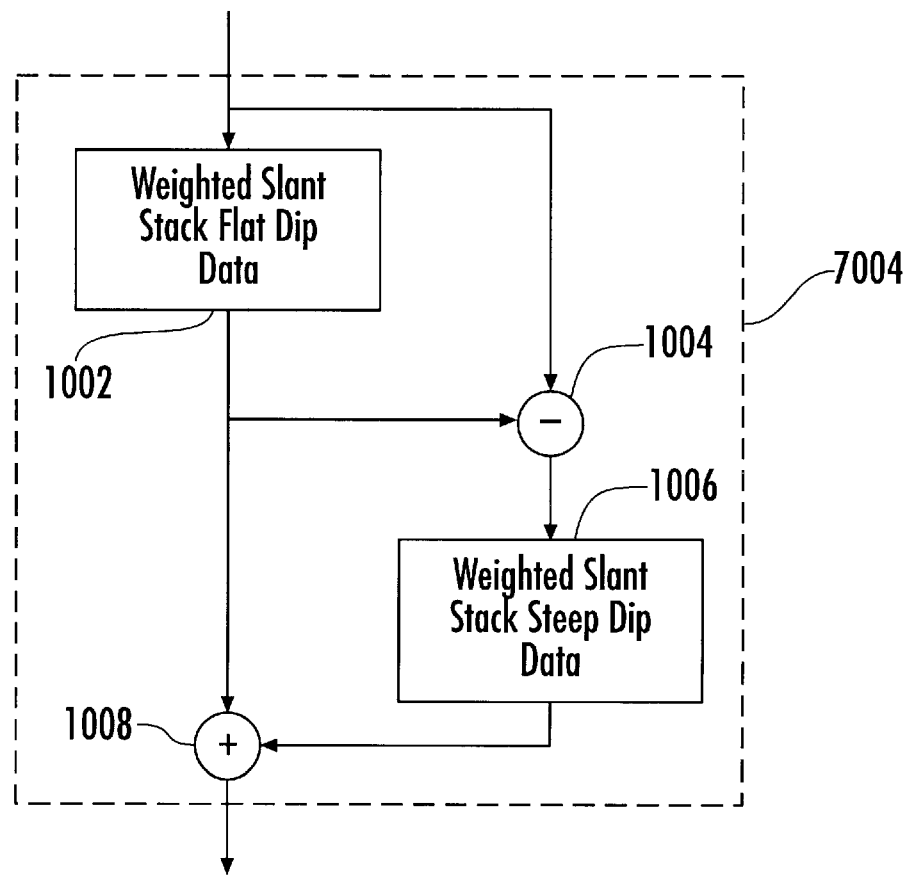
FIG. 10 is a flow chart of a p-anti-alias filter according to the present invention.

The p-anti-aliasing filter 7004 addresses the p-aliasing problem. One non-limiting example embodiment of the p-anti-aliasing filter 7004, illustrated in FIG. 10, divides the total dip range into several sub-ranges. In one non-limiting example, the sub-ranges include one sub-range centered on zero dip and two sub-ranges adjacent to the center sub-range. For example, if the total dip range is −12 milliseconds/trace to +12 milliseconds/trace, one possible division would be: a center sub-range from −4 milliseconds/trace to +4 milliseconds/trace, a steep negative sub-range from −12 milliseconds/trace to −4 milliseconds/trace, and a steep positive sub-range from +4 milliseconds/trace to +12 milliseconds/trace.

The weighted slant stack algorithm described above is then applied to the flat dip data, that is, the data in the center sub-range (block 1002). The filtered data is then subtracted (block 1004) from the original data. The result will be noise plus dipping events in the ranges of, for the example discussed in the previous paragraph, −12 milliseconds/trace to −4 milliseconds/trace and +4 milliseconds/trace to +12 milliseconds/trace. The result is then processed through the weighted slant stack algorithm limiting the dip range to −12 milliseconds/trace to −4 milliseconds/trace and +4 milliseconds/trace to +12 milliseconds/trace (block 1006). Since this excursion of the data through the weighted slant stack algorithm will not encounter flat events, the ambiguity noted above will be removed, thereby avoiding the p-aliasing phenomenon. The output of the second iteration through the weighted slant stack algorithm is then added to the output of the first excursion (block 1008).

Figure 11:
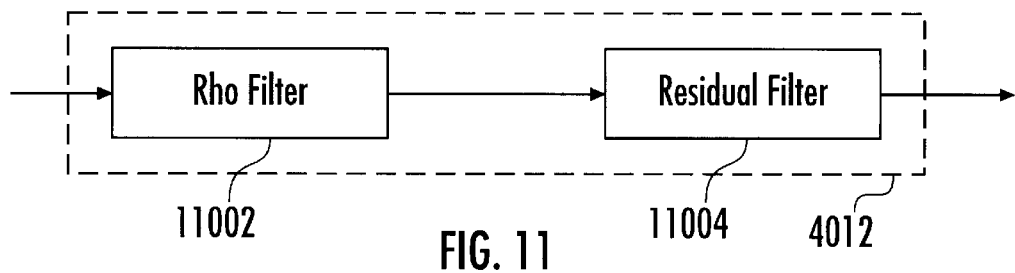
FIG. 11 is a block diagram of a matched filter according to the present invention.

The matched filter to compensate for the limited spatial aperture of the data (block 4012), illustrated in FIG. 11, is a conventional rho filter 11002 followed by a residual filter 11004. The residual filter 11004 is a Wiener filter based on the transform of a set of spikes of unit amplitude into and out of the weighted slant-stack domain. After being subjected to forward and inverse transforms, the output trace (at the grid center) will contain the distortions associated with the transform. The resulting inverse filter can be saved and applied to the data being processed when the conventional rho filter is applied.

Figure 12:
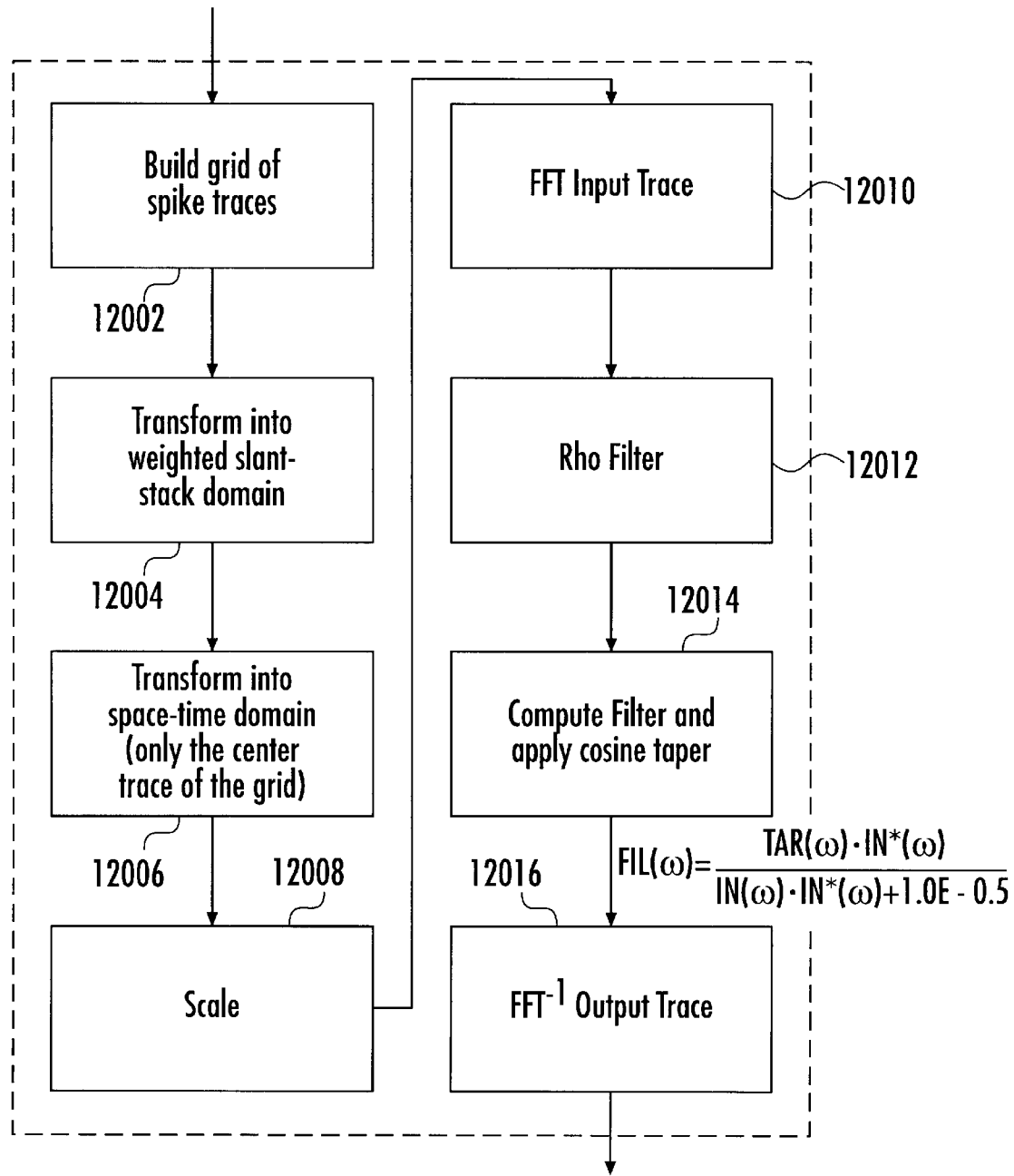
FIG. 12 is a flow chart of a residual filter according to the present invention.

Calculation of the residual filter, illustrated in FIG. 12, begins by building a grid of traces, called input spike traces, with a spike of amplitude equal to 1.0 at the middle of the trace (block 12002). The grid size may be selected by the user and is typically 8×8 or 6×6. If the spike trace is 4.0 seconds long, the unit spike will be at sample 501 assuming a 4 millisecond sampling rate. The grid may consist of a single unit spike trace that is reused at each grid location.

The grid of traces is then transformed to the weighted slant stack domain (block 12004) and the center trace of the grid is transformed back into the space-time domain (block 12006), as discussed above. The parameters used for the transforms are the same as the parameters used for the data being processed so that the grid of traces will undergo the same distortions.

The trace is scaled (block 12008) as described above and processed through a one dimensional FFT (block 12010) and a conventional rho filter (block 12012).

The residual filter is then determined by applying equation (25) to the result (block 12014):

$$FIL(\omega) = \frac{TAR(\omega) \cdot IN^*(\omega)}{IN(\omega) \cdot IN^*(\omega) + 1.0E - 0.5} \quad (25)$$

where

FIL($\omega$) is the inverse filter;

TAR($\omega$) is the target frequency array which is a flat spectrum with amplitude equal to 1.0 and no phase;

IN($\omega$) is the frequency array for the grid center trace after the forward and inverse slant stack processes; and

* represents the complex conjugate.

The quantity $1.0e^{-0.5}$ is to ensure stability in the inverse filter design.

A cosine taper, such as equation (24), is then applied to FIL($\omega$). An inverse FFT is then applied (block 12016) and the result is saved and applied to the data being processed along with the conventional rho filter.

The invention is implemented in various embodiments in hardware, software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++, C, FORTRAN 77 or FORTRAN 90) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The foregoing describes preferred embodiments of the invention and is given by way of example only. The invention is not limited to any of the specific features described herein, but includes all variations thereof within the scope of the appended claims.

What is claimed is:

1. A method of attenuating noise in seismic data, the seismic data comprising a plurality of input traces, the method comprising:

transforming the seismic data from the space-time domain into the slant-stack domain, the transforming being performed in three dimensions in a single operation;

excluding, during said transforming into the slant-stack domain, seismic data having a preselected characteristic; and inverse transforming the transformed data from the slant-stack domain into the time-space domain.

2. The method of claim 1 wherein said transforming comprises transforming the seismic data from the space-time domain into the $\tau$-$p_x$-$p_y$ domain.

3. The method of claim 2 wherein said excluding comprises excluding data corresponding to the coordinates: $t = \tau + p_x x + p_y y$, where t is time, $\tau$ is a t-axis intercept, x is a signed distance from an origin in a first direction, y is a signed distance from an origin in a second direction, $p_x$ is slope in the first direction and $p_y$ is slope in the second direction.

4. A method of attenuating noise in seismic data comprising:

accepting seismic data comprising a plurality of traces arrayed in two physical dimensions and a time dimension; and transforming the seismic data into the slant stack domain using a Radon transform, the transforming being performed in the two physical dimensions and the time dimension in a single operation.

5. The method of claim 4 wherein the Radon transform comprises a three-dimensional transform using the following equation:

$$T(\tau, p_x, p_y) = \frac{N \cdot \sum_{x=a}^{b} \sum_{y=c}^{d} S_{x,y}(\tau + p_x x + p_y y, x, y) \cdot F_{x,y}(\tau + p_x x + p_y y, x, y)}{\sum_{x=a}^{b} \sum_{y=c}^{d} F_{x,y}(\tau + p_x x + p_y y, x, y)}$$

where:

N is the number of traces in the plurality of traces;

$S_{x,y}(t)$ is a subset of the plurality of traces;

$F_{x,y}(t)$ is a scaling function;

x is a distance in a first direction;

$p_x$ is a slope in the first direction;

y is a distance in a second direction;

$p_y$ is a slope in the second direction;

a and b for the first direction and c and d for the second direction define a volume to be transformed;

t is time in the space-time domain;

$\tau$ is intercept time in the $\tau$-p domain; and $T(\tau, p_x, p_y)$ is the output data.

6. The method of claim 5 wherein $$F_{x,y}(t) = \frac{1}{\overline{S}_{x,y}(t)}$$

where $\overline{S}_{x,y}(t)$ is an average of $S_{x,y}(t)$ over predetermined ranges of x,y and t for each x, y and t.

7. The method of claim 5 wherein $$F_{x,y}(t) = \frac{1}{\overline{S}^2_{x,y}(t)}$$

where
$\overline{S}^2_{x,y}(t)$ is an average of $S^2_{x,y}(t)$ over predetermined ranges of x,y and t for each x, y and t.

8. The method of claim 5 wherein
a, b, c and d are such that x and y span $S_{x,y}(t)$.

9. The method of claim 5 wherein
a, b, c and d are such that x and y define a subset of $S_{x,y}(t)$.

10. The method of claim 9 wherein
the subset defining $S_{x,y}(t)$ is the full set.

11. The method of claim 4 further comprising
Fourier transforming $T(\tau,p_x,p_y)$;
multiplying the Fourier-transformed data by $(\omega^2$; and
inverse-Fourier transforming the Fourier-transformed data.

12. The method of claim 4 wherein the Radon transform comprises
a two-dimensional transform using the following equation:

$$T(\tau, p) = \frac{N \cdot \sum_{x=a}^{b} S_{x,y}(\tau + px, x) \cdot F_{x,y}(\tau + px, x)}{\sum_{x=a}^{b} F_{x,y}(\tau + px, x)}$$

where:
N is the number of traces in the plurality of traces;
$S_{x,y}(t)$ is a subset of the plurality of traces;
$F_{x,y}(t)$ is a scaling function;
x is a distance from the origin;
p is a slope;
a and b define a slice of data to be transformed;
t is time in the space-time domain;
$\tau$ is intercept time in the $\tau$–p domain; and
$T(\tau,p)$ is the output data.

13. The method of claim 4 further comprising
applying an anti-aliasing filter.

14. The method of claim 13 wherein
applying is performed in the slant stack domain.

15. The method of claim 4 further comprising
applying a matched filter to compensate for limited spatial aperture.

16. The method of claim 4 further comprising
inverse Radon transforming the transformed data.

17. A method of attenuating noise in seismic data, the seismic data comprising a plurality of traces arrayed in two physical dimensions and the time dimension, the method comprising:
(a) selecting a volume, the volume comprising a subset of the plurality of traces;
(b) transforming the volume into the slant stack domain using a Radon transform, the transforming being performed in a single operation in three dimensions;
(c) inverse transforming the transformed volume into the time domain using a inverse Radon transform; and
(d) repeating elements (b) and (c) with a new volume.

18. The method of claim 17 wherein
the new volume overlaps the volume.

19. The method of claim 17 further comprising
iteratively repeating elements (b) and (c) with new volumes for each iteration, each successive new volume overlapping the preceding new volume.

20. The method of claim 19 wherein the plurality of traces are arrayed in rows and the overlap between each successive new volume and the preceding new volume is one row.

21. A method of attenuating noise in zero offset and/or common offset seismic data, the seismic data comprising a plurality of input traces, the method comprising
(i) computing scaling traces from the input traces;
(j) modifying the input traces using the scaling traces;
(k) slant-stack transforming the modified input traces, excluding slopes corresponding to coherent noise from the slant stack transform, to produce slant-stack-domain signal traces, the transforming performed in a single operation in three dimensions;
(l) slant stack transforming the scaling traces to produce slant stack domain scaling traces;
(m) modifying the slant stack domain signal traces using the slant stack domain scaling traces;
(n) scaling and filtering the modified slant stack domain signal traces to produce weighted slant stacked traces,
(o) inverse slant stack transforming the weighted slant stacked traces; and
(p) scaling the inverse-slant stack transformed weighted slant stacked traces.

22. A computer program for attenuating noise in seismic data, the computer program executing on a computer processor, the computer program residing on computer readable media, the computer program comprising code for causing the computer processor to:
transform the seismic data from the time-space domain to the slant stack domain in a single operation in three dimensions;
exclude transformed seismic data having a preselected characteristic; and
transform the transformed data from the slant stack domain into the time-space domain.

23. An apparatus for attenuating noise in seismic data, the seismic data comprising a plurality of input traces, the apparatus comprising:
means for transforming the seismic data from the time-space domain to the slant stack domain in a single operation in three dimensions;
wherein the transforming means comprises means for excluding, during said transforming into the slant-stack domain, seismic data having a preselected characteristic; and
means for transforming the transformed data from the slant stack domain into the time-space domain.

24. An apparatus for anti-alias filtering seismic traces comprising
means for calculating a Nyquist dip $p_N$;
means for selecting one or more dip traces having magnitudes greater than the Nyquist dip;
means for calculating an alias frequency $f_{alias}$;
means for applying an FFT to the selected dip traces to produce transformed selected dip traces comprising samples; and
means for zeroing all samples in each of the transformed selected dip traces with frequencies greater than $f_{alias}$.

25. The apparatus of claim 24 further comprising means for cosine tapering the zeroed transformed selected dip traces.

26. The apparatus of claim 24 wherein the apparatus comprises a three-dimensional anti-aliasing filter and the means for calculating a Nyquist dip $p_N$ comprises applying the following equation:

$$p_N = \frac{\sqrt{\frac{1}{\Delta x^2} + \frac{1}{\Delta y^2}}}{2 \cdot f_{Nyquist}};$$

where $\Delta x$ and $\Delta y$ are sampling intervals in the x and y directions, respectively; and $f_{Nyquist}$ is the Nyquist frequency.

27. The apparatus of claim 24 wherein the apparatus comprises a two-dimensional anti-aliasing filter and the means for calculating a Nyquist dip $p_N$ comprises applying the following equation:

$$p_N = \frac{1}{2 \cdot \Delta x \cdot f_{Nyquist}};$$

where $\Delta x$ is the sampling interval in the x direction; and $f_{Nyquist}$ is the Nyquist frequency.

28. The apparatus of claim 24 wherein the apparatus comprises a three-dimensional anti-aliasing filter and the means for calculating an alias frequency $f_{alias}$ comprises applying the following equation:

$$f_{alias} = \frac{\sqrt{\frac{1}{\Delta x^2} + \frac{1}{\Delta y^2}}}{2 \cdot \sqrt{p_x^2 + p_y^2}};$$

where $\Delta x$ and $\Delta y$ are the sampling intervals in the x and y directions, respectively;

$p_x$ is the current dip in the x-direction;

$p_y$ is the current dip in the y-direction; and $f_{alias}$ is the Nyquist dip.

29. The apparatus of claim 24 wherein the apparatus comprises a two-dimensional anti-aliasing filter and the means for calculating an alias frequency $f_{alias}$ comprises applying the following equation:

$$f_{alias} = \frac{1}{2 \cdot \Delta x \cdot p};$$

where $\Delta x$ is the sampling interval in the x direction; and p is the current dip.

30. A method for p-anti-alias filtering seismic traces comprising
applying a weighted slant stack algorithm to the seismic data for a flat dip range to produce a first result;
subtracting the first result from the seismic data to produce a second result;
applying the weighted slant stack algorithm to the second result to produce a third result; and
adding the third result to the first result.

31. The method of claim 30 wherein
the flat dip range is centered around zero dip.

32. A method of attenuating noise in seismic data comprising:
accepting seismic data comprising a plurality of traces arrayed in two physical dimensions and a time dimension;
transforming the seismic data into the slant stack domain using a Radon transform; and
recovering amplitudes of the seismic data lost in transforming the seismic data into the slant stack domain.

33. The method of claim 32 wherein the recovering amplitudes comprises:
Fourier transforming the Radon transform T($\tau$, px, py);
multiplying the Fourier transformed Radon transformed data by the square of an angular frequency, $\omega^2$; and
inverse Fourier transforming the data after the multiplying.

34. The method of claim 32 wherein the transforming into the slant stack domain is performed in three dimensions in s single operation.

35. The method of claim 32 further comprising anti-alias filtering the slant stack transformed data.

36. The method of claim 32 further comprising applying a matched filter for compensate for limited spatial aperture.

37. The method of claim 32 further comprising excluding, during the transforming into the slant stack domain, seismic data having a preselected characteristic.

38. A method of attenuating noise in seismic data, the seismic data comprising a plurality of traces arrayed in two physical dimensions and the time dimension, the method comprising:
(a) selecting a first volume, the volume comprising a subset of the plurality of traces;
(b) transforming the first volume into the slant stack domain using a Radon transform;
(c) inverse transforming the transformed first volume into the time domain using a inverse Radon transform; and
(d) repeating elements (b) and (c) with a second volume, wherein the second volume overlaps the first volume.

39. The method of claim 38 further comprising iteratively repeating elements (b) and (c) with a new volume for each iteration, wherein each new volume overlaps the preceding volume.

40. The method of claim 38 wherein the plurality of traces are arrayed in rows and the overlap between each successive new volume and the preceding volume is one row.

41. A method of attenuating noise in seismic data comprising:
accepting seismic data comprising a plurality of traces arrayed in two physical dimensions and a time dimension;
transforming the seismic data into the slant stack domain using a Radon transform;
Fourier transforming the slant stack transformed data;
multiplying the Fourier transformed data by an angular frequency $\omega$; and
inverse Fourier transforming the data after the multiplying.

* * * * *